United States Patent
Kim et al.

(10) Patent No.: US 12,550,240 B2
(45) Date of Patent: Feb. 10, 2026

(54) LIGHT EMITTING DIODE DRIVING CIRCUIT AND BACKLIGHT APPARATUS OF DISPLAY

(71) Applicant: LX SEMICON CO., LTD., Daejeon (KR)

(72) Inventors: Jangsu Kim, Daejeon (KR); Sangsuk Kim, Seoul (KR); Jihwan Kim, Seoul (KR); Kyeongrok Lee, Seoul (KR); Jongmin Lee, Seoul (KR)

(73) Assignee: LX SEMICON CO., LTD., Daejeon (KR)

( * ) Notice: Subject to any disclaimer, the term of this patent is extended or adjusted under 35 U.S.C. 154(b) by 124 days.

(21) Appl. No.: 18/343,594

(22) Filed: Jun. 28, 2023

(65) Prior Publication Data

US 2024/0008152 A1    Jan. 4, 2024

(30) Foreign Application Priority Data

Jun. 29, 2022    (KR) .................. 10-2022-0079899

(51) Int. Cl.
*H05B 45/30*    (2020.01)
*H05B 45/325*    (2020.01)
*H05B 45/48*    (2020.01)

(52) U.S. Cl.
CPC ........... *H05B 45/48* (2020.01); *H05B 45/325* (2020.01)

(58) Field of Classification Search
CPC ........ H05B 45/10; H05B 45/14; H05B 45/20; H05B 45/24; H05B 45/30; H05B 45/32; H05B 45/325; H05B 45/40; H05B 45/44; H05B 45/46; H05B 45/48; G09G 3/30; G09G 3/32; G09G 3/34; G09G 3/34; G09G 3/3406
See application file for complete search history.

(56) References Cited

U.S. PATENT DOCUMENTS

| | | | |
|---|---|---|---|
| 8,461,769 B2 * | 6/2013 | Shiu .................. | H05B 45/46 315/185 S |
| 2010/0072898 A1 * | 3/2010 | Ohashi ............... | H05B 45/345 315/186 |

* cited by examiner

*Primary Examiner* — Long Nguyen
(74) *Attorney, Agent, or Firm* — ROTHWELL, FIGG, ERNST & MANBECK, P.C.

(57) ABSTRACT

An LED driving circuit can include a switching element connected to one end of an LED string and configured to adjust current flowing through the LED string, and a withstanding-voltage reducing circuit connected in parallel with the switching element and configured to allow a leakage current to flow when a voltage at a point connected in parallel with the switching element exceeds a predetermined voltage.

18 Claims, 9 Drawing Sheets

LIGHT EMITTING DIODE DRIVING CIRCUIT AND BACKLIGHT APPARATUS OF DISPLAY

CROSS-REFERENCE TO RELATED APPLICATIONS

The present application claims the benefits of priority to Korean Patent Application No. 10-2022-0079899, filed on Jun. 29, 2022, all of which are incorporated herein by reference in their entireties.

THE BACKGROUND

1. The Field

The embodiment relates to an LED driving circuit and a display device comprising the LED driving circuit.

2. Description of the Related Art

As informatization progresses, various display devices capable of visualizing information are being developed. Display devices developed or being developed until recently comprise a liquid crystal display (LCD) display device, an organic light emitting diode (OLED) display device, a plasma display panel (PDP) display device, etc. These display devices are evolving to properly display high-resolution images.

Meanwhile, there are various schemes of driving a display panel equipped with a light emitting diode (LED). Representative driving schemes comprise a pulse amplitude modulation (PAM) scheme and a pulse width modulation (PWM) scheme. The PAM scheme is a scheme of supplying an analog voltage corresponding to a gradation value of a pixel to the pixel and differently controlling the magnitude of current flowing to the pixel according to the analog voltage. The PWM scheme is a scheme of adjusting the time of the current supplied to the pixel according to the gradation value of the pixel.

As an example, in the display panel, a desired image is displayed as the LED emits light according to the current flowing through the LED included in each of a plurality of pixels.

Recently, mini LEDs or micro LEDs for display using small or super small LEDs have been developed. The mini/micro LED is used for a display or a backlight. As an example, when the mini/micro LED is used for the backlight, the backlight is configured by including an LED string in which a plurality of LEDs are connected in series. At this time, the brightness of the backlight is adjusted by controlling the current flowing through the LED string. When a plurality of LED strings are provided in the backlight, the backlight is divided into a plurality of regions corresponding to each LED string. A LED driving circuit controlling each LED string differentially adjusts the brightness of the corresponding LED string. Accordingly, the backlight is divided into a plurality of dimming regions.

Meanwhile, as the LED string is configured by connecting a plurality of LEDs in series, a relatively high voltage is applied to a switching element connected to control the LED string. As the high voltage is applied to the switching element, the switching element capable of withstanding the high voltage is required. Accordingly, there are disadvantages in that the size of the switching element (eg, PET) constituting the LED driving circuit is increased, and an expensive process is required.

Therefore, it is necessary to develop a technology capable of reducing the size of the LED driving circuit by reducing the voltage applied to the switching element for controlling the LED string.

BRIEF SUMMARY

An object of the embodiment is to provide an LED driving circuit for lowering a voltage applied to a switching element for controlling a current flowing in an LED string when driving the LED string including a plurality of LEDs connected in series.

Another object of the embodiment is to provide a display device for lowering a voltage applied to a switching element included in a LED string when driving the LED string corresponding to one dimming region among a plurality of dimming regions in the backlight divided into the plurality of dimming regions.

According to one aspect of the embodiment, an LED driving circuit can comprise: a switching element connected to one end of an LED string and configured to adjust current flowing through the LED string; and a withstanding-voltage reducing circuit connected in parallel with the switching element and configured to allow a leakage current to flow when a voltage at a point connected in parallel with the switching element exceeds a predetermined voltage.

The switching element can comprise a field effect transistor.

The switching element can adjust the current flowing through the LED string based on an input voltage of a gate terminal thereof.

The withstanding-voltage reducing circuit can allow the leakage current to flow within a time period in which the current flowing through the switching element is blocked based on the input voltage of the gate terminal.

The withstanding-voltage reducing circuit cannot allow the leakage current to flow within a time period in which current flows through the switching element based on the input voltage of the gate terminal.

The withstanding-voltage reducing circuit can comprise at least one or more Zener diode.

The withstanding-voltage reducing circuit can comprise a plurality of Zener diodes, and the predetermined voltage can be determined based on the number of the plurality of Zener diodes.

The wherein the withstanding-voltage reducing circuit can further comprise at least one resistor.

The amount of leakage current flowing through the withstanding-voltage reducing circuit can be determined according to a resistance value of the at least one resistor.

The switching element and the withstanding-voltage reducing circuit can be configured as one LED driving integrated circuit.

The switching element can be connected to one end of the LED string through a point connected in parallel with the switching element, and the switching element and the withstanding-voltage reducing circuit can be connected to a channel output terminal.

According to another aspect of the embodiment, a display device can comprise: a plurality of LED strings; and a plurality of LED driving circuits each connected to the plurality of LED strings, wherein each of the plurality of LED driving circuits can comprise: a switching element connected to one end of each of the plurality of LED strings and configured to adjust current flowing through each of the plurality of LED strings; and a withstanding-voltage reducing circuit connected in parallel with the switching element and configured to allow a leakage current to flow when a voltage at a point connected in parallel with the switching element exceeds a predetermined voltage.

The switching element can comprise a field effect transistor.

The switching element can adjust the current flowing through the LED string based on an input voltage of a gate terminal thereof.

The withstanding-voltage reducing circuit can allow the leakage current to flow within a time period in which the current flowing through the switching element is blocked based on the input voltage of the gate terminal.

The withstanding-voltage reducing circuit cannot allow the leakage current to flow within a time period in which current flows through the switching element based on the input voltage of the gate terminal.

The withstanding-voltage reducing circuit can comprise at least one or more Zener diode.

The withstanding-voltage reducing circuit can comprise a plurality of Zener diodes, and the predetermined voltage can be determined based on the number of the plurality of Zener diodes.

The withstanding-voltage reducing circuit can further comprise at least one resistor.

The amount of leakage current flowing through the withstanding-voltage reducing circuit can be determined according to a resistance value of the at least one resistor.

As described above, according to the embodiment, it is possible to reduce the size of a LED driving circuit by lowering a voltage applied to a switching element connected to the LED string and for controlling the current of a LED string. Accordingly, the process cost for manufacturing the LED driving circuit can be reduced, and price competitiveness can be improved.

DETAILED DESCRIPTION

Hereinafter, some embodiments of the present invention will be described in detail through exemplary drawings. In adding reference numerals to the components of each drawing, it should be noted that the same components have the same reference numerals as much as possible, even if they are shown on different drawings. In addition, in describing the present invention, if it is determined that a detailed description of a related known configuration or function can obscure the gist of the present invention, the detailed description will be omitted.

Also, terms such as first, second, A, B, (a), and (b) can be used in describing the components of the present invention. These terms are only used to distinguish the components from other components, and the nature, turn, or order of the component is not limited by the terms. When a component is described as being "connected," "coupled," or "joined" to another component, that component is or can be directly connected, coupled or joined to the other component, but it should be understood that another component between the components can be "connected", "coupled" or "joined".

In the following description, withstand voltage and breakdown voltage can be used interchangeably.

Figure 1:
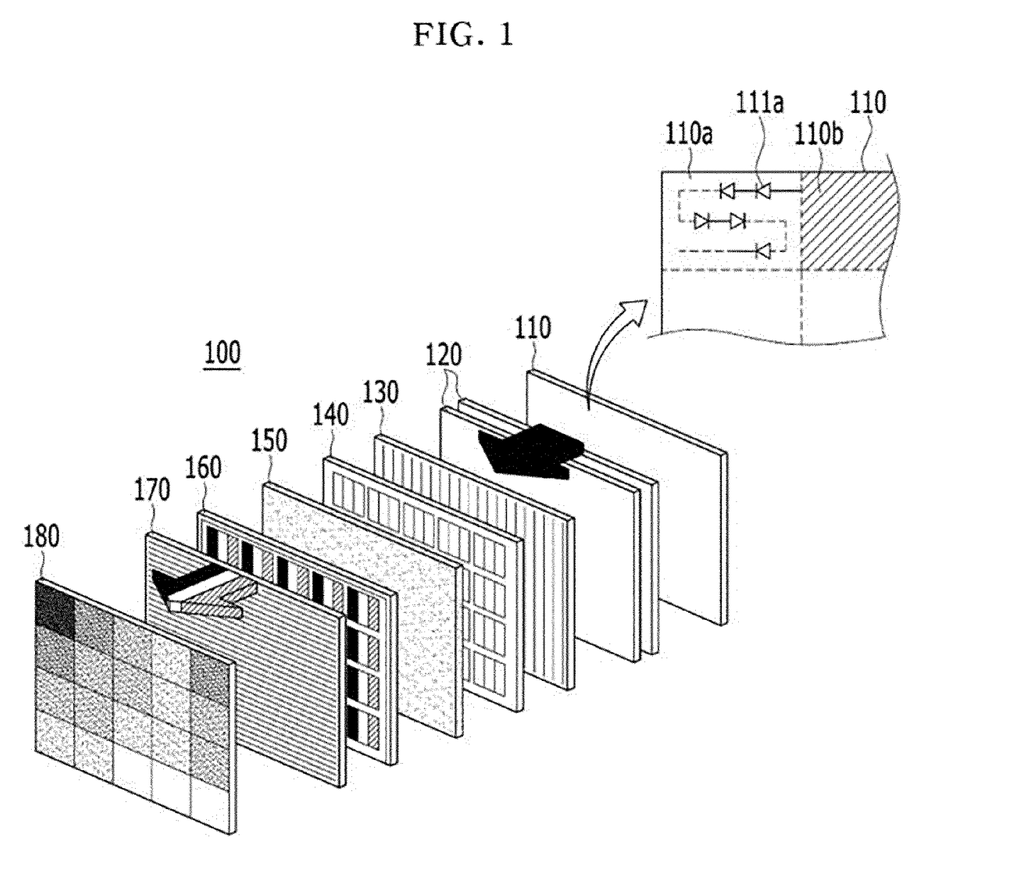
FIG. 1 is an exploded perspective view of a display device according to an embodiment.

FIG. 1 is an exploded perspective view of a display device according to an embodiment.

The display device 100 according to the embodiment can be an LCD display device comprising an LED backlight, but is not limited thereto. Various embodiments to be described later are not limited to the display device 100 of the form shown in FIG. 1 and can be applied to any display device using an LED string as a light source.

Referring to FIG. 1, the display device 100 according to an embodiment can comprise a backlight 110, a diffusions layer 120, a first polarizing film 130, and a thin film transistor (TFT) substrate 140, a liquid crystal layer 150, a color filter 160, a second polarizing film 170, and a front layer 180. Components included in the display device 100 of FIG. 1 can be shown as an example, and at least one component can be omitted or other components can be added.

According to the embodiment, the backlight 110 can emit light from the rear surface of the liquid crystal layer 150 and can be used as a light source of the display device 100. As shown in FIG. 1, the backlight 110 can be divided into a plurality of regions 110a, 110b, . . . . The luminance (or brightness) of the backlight 110 can be controlled to be different for each divided region. This control scheme can be referred to as local dimming. For example, a plurality of LEDs can be disposed in each region 110a, 110b, . . . of the backlight 110. The plurality of LEDs disposed in each region can be connected in series to form a single string, which can be referred to as an LED string 111a. Therefore, one LED string can be included in each region, but is not limited thereto.

According to the embodiment, an LED driving circuit can be connected to the LED string 111a. The LED driving circuit can control each LED string 111a corresponding to each of the divided regions 110a and 110b of the backlight 110. For example, the LED driving circuit can control a current flowing through the corresponding LED string 111a. Accordingly, the luminance (or brightness) of the region corresponding to the LED string 111a can be adjusted. According to an embodiment, the backlight 110 can be referred to as a display device.

Figure 2:
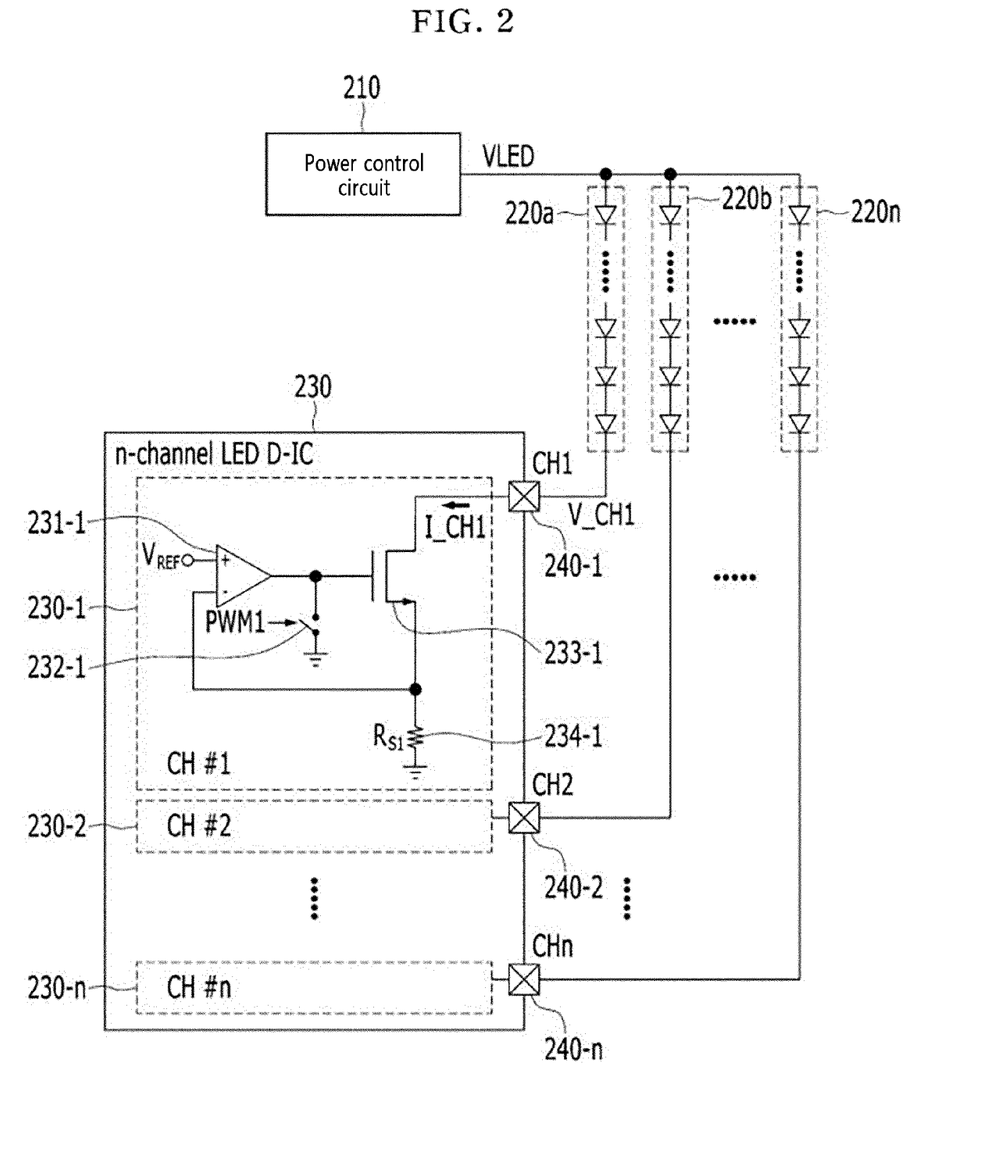
FIG. 2 is a circuit diagram of a display device comprising an LED driving circuit according to a first embodiment.

FIG. 2 is a circuit diagram of a display device comprising an LED driving circuit according to a first embodiment.

Referring to FIG. 2, the display device according to the first embodiment can comprise a power control circuit 210, a plurality of LED strings 220a, 220b, . . . , and 220n, and an LED driving integrated circuit (IC) 230 (or LED driving chip). The LED driving IC 230 can comprise a plurality of LED driving circuits corresponding to a plurality of channels. For example, the plurality of channels can be n channels. For example, the LED driving IC 230 can comprise a first LED driving circuit 230-1, a second LED driving circuit 230-2, . . . , and an nth LED driving circuit 230-n. The plurality of LED driving circuits 230-1 to 230-n can be included in one integrated circuit (eg, LED driving IC 230) or a chip, but are not limited thereto.

According to the embodiment, each LED string 220a, 220b, . . . , and 220n can comprise a plurality of LEDs. The plurality of LEDs can be connected in series with each other. According to various embodiments, as described above with reference to FIG. 1, each of the LED strings 220a, 220b, . . . , and 220n can be applied to each of the divided regions 110a and 110b (eg, a dimming region) of the backlight 110. That is, each of the LED strings 220a, 220b, . . . , and 220n can be provided in a corresponding region to implement local dimming.

An output voltage (eg, VLED) of the power control circuit 210 can be applied to one end (eg, anode terminal) of each of the LED strings 220a, 220b, . . . , and 220n. The power control circuit 210 can convert an input voltage Vin into a voltage VLED for emitting each of the LED strings (220a, 220b, . . . , and 220n), and apply the converted voltage VLED into the one end (eg, anode terminal) of each LED string. The output voltage VLED of the power control circuit 210 can be a voltage sufficient to emit light of each LED string (220a, 220b, . . . , and 220n). For example, it can be assumed that each LED string includes 40 LEDs and the forward voltage Vf of each LED is 3V. In this case, the voltage VLED for emitting light of each of the LED strings 220a, 220b, . . . , and 220n can be 120V (40×3V).

According to the embodiment, each LED driving circuit (eg, the first LED driving circuit 230-1, the second LED driving circuit 230-2, . . . , the nth LED driving circuit 230-n) can be connected to each of the plurality of LED strings (220a, 220b, . . . , and 220n). For example, the first LED driving circuit 230-1 can be connected to the first LED string 220a. For example, the second LED driving circuit 230-2 can be connected to the second LED string 220b. For example, the nth LED driving circuit 230-n can be connected to the nth LED string 220n. Hereinafter, for convenience of description, the first LED driving circuit 230-1 among the plurality of LED driving circuits 230-1, 230-2, . . . , 230-n will be described. However, other LED driving circuits can also be configured identically or similarly to the first LED driving circuit 230-1 or can operate identically or similarly.

According to an embodiment, the first LED driving circuit 230-1 can comprise an operational amplifier 231-1, a switch 232-1, a switching element (eg, a field effect transistor (FET) 233-1), and a resistor 234-1. Elements constituting the first LED driving circuit 230-1 shown in FIG. 2 are exemplary and can be variously modified. For example, FIG. 2 illustrates an FET 233-1 as an example of a switching element. However, according to various embodiments, the switching element can comprise various transistors such as a bipolar junction transistor (BJT) as well as an FET. In embodiments to be described later, an FET is described as an example of the switching element, but is not limited thereto. For example, the first LED driving circuit 230-1 can control a current I_CH1 flowing from the first LED string 220a to the first LED driving circuit 230-1. In the embodiment, any element can be used as long as it is capable of controlling the luminance (or brightness) of the first LED string 220a.

According to the embodiment, a drain terminal of the switching element 233-1 included in the first LED driving circuit 230-1 can be connected to a first channel output terminal (CH1) (240-1) of the first LED driving circuit 230-1. 1), and the first channel output terminal (CH1) 240-1 of the first LED driving circuit 230-1 can be connected to one end (eg, cathode terminal) of the first LED string 220a. Likewise, a drain terminal of the switching element 233-2 included in the second LED driving circuit 230-2 can be connected to the second channel output terminal (CH2) 240-2 of the second LED driving circuit 230-2, and the second channel output terminal (CH2) 240-2 of the second LED driving circuit 230-2 can be connected to one end (eg, cathode terminal) of the second LED string 220b. A drain terminal of the switching element 233-n included in the n-th LED driving circuit 230-n can be connected to the n-th channel output terminal (CHn) 240-n of the n-th LED driving circuit 230-n, and the n-th channel output terminal (CHn) 240-n of the n-th LED driving circuit 230-n can be connected to one end (eg, cathode terminal) of the n-th LED string 220n.

According to an embodiment, a source terminal of the switching element 233-1 can be connected to ground through a resistor RS1 (234-1). A gate terminal of the switching element 233-1 can be connected to an output terminal of the operational amplifier 231-1. A line of the reference voltage VREF can be input to a non-inverting terminal (+) among input terminals of the operational amplifier 231-1. an inverting terminal (−) among the input terminals of the operational amplifier 231-1 can be connected to a source terminal of the switching element 233-1. an inverting terminal (−) of the operational amplifier 231-1 can be connected to a node between the source terminal of the switching element 233-1 and the resistor RS1 (234-1).

For example, the operational amplifier 231-1 can output a difference between the reference voltage VREF and the source voltage, and input the difference between the reference voltage VREF and the source voltage into the gate terminal of the switching element 233-1. The source voltage can be the voltage of the source terminal of the switching element 233-1. At a node between the output terminal of the operational amplifier 231-1 and the gate terminal of the switching element 233-1, a switch 232-1 can be connected in parallel with the operational amplifier 231-1 or the switching element 233-1.

The switch 232-1 can be turned on/off in response to a Pulse Width Modulation (PWM) signal. As the switch 232-1 is turned on/off in response to the PWM signal, current flowing from the drain terminal to the source terminal of the switching element 233-1 can be controlled. For example, the amount of current flowing from the drain terminal to the source terminal of the switching element 233-1 can be adjusted according to the duty cycle of the PWM signal. The amount of current flowing from the drain terminal to the source terminal of the switching element 233-1 can correspond to the amount of current flowing through the first LED string 220a connected to the first LED driving circuit 230-1. The luminance (or brightness) of the first LED string 220a can be adjusted according to the amount of current flowing through the first LED string 220a.

Accordingly, each LED driving circuit (230-1, 230-2, . . . , 230-n) included in the LED driving IC 230 can adjust the luminance (or brightness) of each of the LED strings 220a, 220b, . . . , and 220n by adjusting the duty cycle each of the PWM signals PWM1, PWM2, . . . , and PWMn. For example, each of the LED driving circuits 230-1, 230-2, . . . , 230-n can differently adjust the duty cycle of the PWM signal to obtain different luminance of each of the dimming regions. A local dimming of the backlight can be implemented by this control scheme.

According to the control of the PWM signal, the switching element 233-1 can be turned on so that a current can flow from a drain terminal of the switching element 233-1 to a source terminal. In this case, a plurality of LEDs included in the first LED string 220a can emit light by a current (eg, I_CH1) flowing through the first LED string 220a. On the other hand, the switching element 233-1 can be turned off according to the control of the PWM signal so that current cannot flow from the drain terminal of the switching element 233-1 to the source terminal. In this case, since current does not flow through the first LED string 220a, the plurality of LEDs included in the first LED string 220a cannot emit light.

According to the embodiment, when the current does not flow from the drain terminal of the switching element 233-1 to the source terminal due to the turn-off of the switching element 233-1, as current does not flow in the first LED string 220a, no voltage drop occurs in the first LED string 220a. Accordingly, the voltage (V_CH1) applied to the first channel output terminal (CH1) 240-1 located between the first LED driving circuit 230-1 and the first LED string 220a can theoretically be the same voltage as the voltage applied to the first LED string 220a, that is, the output voltage VLED of the power control circuit 210 (eg, 120V). Since the voltage drop due to the parasitic capacitor of the first LED string 220a can be substantially reflected, the voltage V_CH1 applied to the first channel output terminal CH1 240-1 can be a smaller value (eg, 55V) than the output voltage VLED (eg, 120V) of the power control circuit 210.

According to the embodiment, as the number of LEDs included in the first LED string 220a increases, the magnitude of the output voltage VLED of the power control circuit 210 can increase. As the magnitude of the output voltage VLED increases, the magnitude of the voltage V_CH1 applied to the switching element 233-1 can increase in a state in which current does not flow through the first LED string 220a. As the magnitude of the voltage (V_CH1) applied to the switching element 233-1 increases, a switching element 233-1 capable of withstanding the corresponding voltage can be strongly required. That is, a switching element 233-1 having a relatively high withstand voltage for the output voltage VLED can be used. As the size of the output voltage VLED of the power control circuit 210 increases, when a switching element 233-1 having a high withstand voltage is used, the size of the switching element 233-1 can increase. When the switching element 233-1 for each channel is configured within one LED driving IC 230, an expensive process can be required to manufacture the LED driving IC 230. The withstand voltage can be referred to as breakdown voltage.

Even if the size of the VLED increases for driving each of the LED strings 220a, 220b, . . . , and 220n including a plurality of LEDs, by controlling the voltage applied to the switching element 233-1 to be reduced, an LED driving circuit enabling the use of the switching element 233-1 having a relatively low withstand voltage will be described in an embodiment to be described later.

Figure 3:
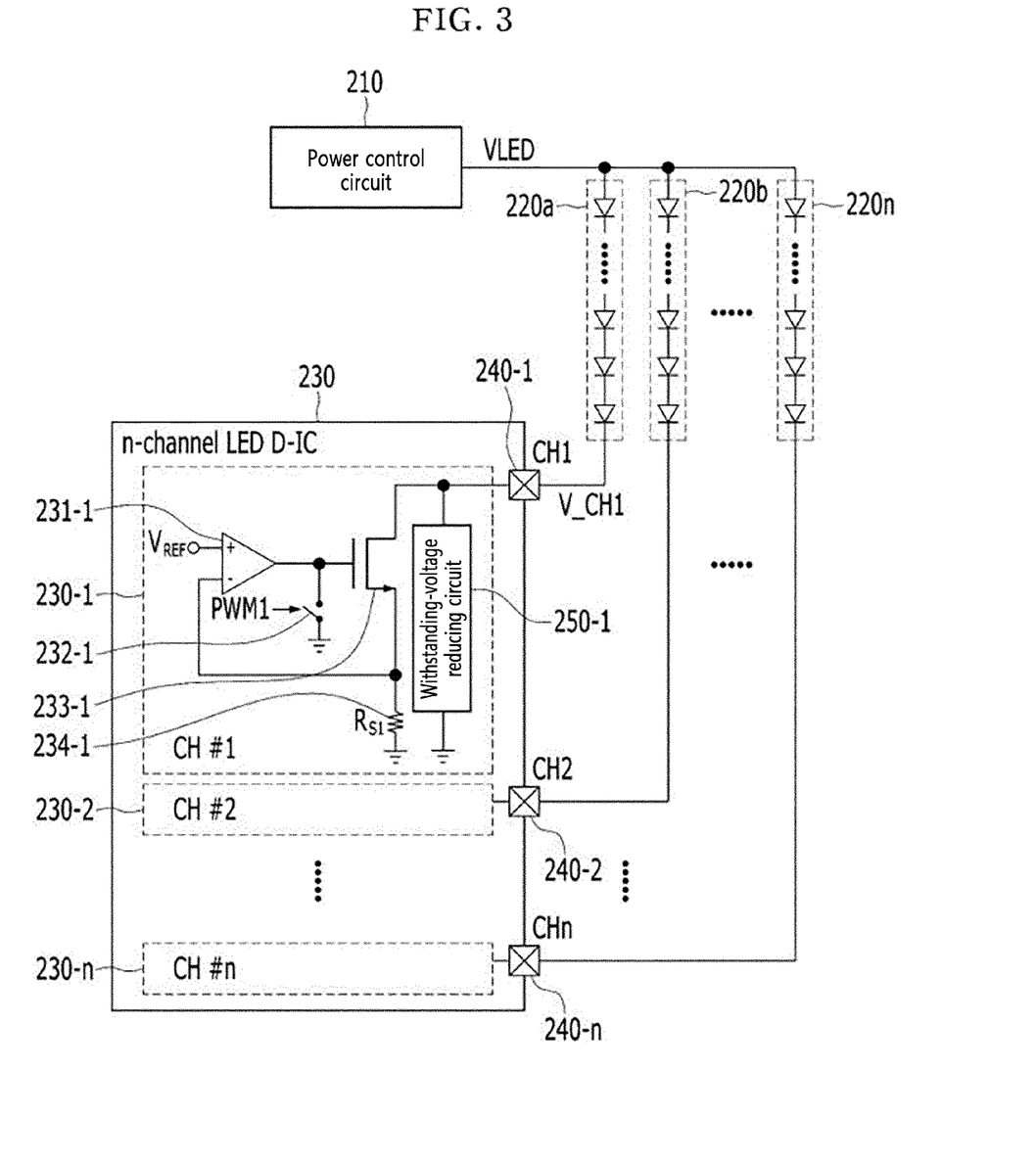
FIG. 3 is a circuit diagram of a display device comprising an LED driving circuit according to a second embodiment.

FIG. 3 is a circuit diagram of a display device comprising an LED driving circuit according to a second embodiment.

Referring to FIG. 3, the display device according to the second embodiment can comprise a power control circuit 210, a plurality of LED strings 220a, 220b, . . . , and 220n, and an LED driving IC 230 (or LED driving chip). The LED driving IC 230 can comprise a plurality of LED driving circuits corresponding to a plurality of channels. For example, the LED driving IC 230 can comprise a first LED driving circuit 230-1, a second LED driving circuit 230-2, . . . , and an nth LED driving circuit 230-n. The plurality of LED driving circuits 230-1 to 230-n can be included in a single integrated circuit (eg, the LED driving IC 230) or a chip. Hereinafter, among the descriptions of FIG. 2, the same or similar descriptions as those of FIG. 3 will be omitted.

According to an embodiment, the first LED driving circuit 230-1 can comprise an operational amplifier 231-1, a switch 232-1, a switching element (eg, a field effect transistor (FET) 233-1), a resistor 234-1 and a withstanding-voltage reducing circuit 250-1. Elements constituting the first LED driving circuit 230-1 shown in FIG. 3 are exemplary and can be modified in various ways. For example, the first LED driving circuit 230-1 can control a current I_CH1 flowing from the first LED string 220a to the first LED driving circuit 230-1. In the embodiment, any element can be used as long as it is capable of controlling the luminance (or brightness) of the first LED string 220a.

According to the embodiment, the withstanding-voltage reducing circuit 250-1 can be connected to the switching element 233-1 at a node between the first LED string 220a and the switching element 233-1, that is, the drain terminal. The withstanding-voltage reducing circuit 250-1 can be connected in parallel with the switching element 233-1. The switching element 233-1 and the withstanding-voltage reducing circuit 250-1 can be connected to a point connected in parallel with the switching element 233-1 (eg, the first channel output terminal CH1 240-1).

When the voltage (eg, V_CH1) at the first channel output terminal (CH1) 240-1 exceeds a predetermined voltage (eg, 40V), leakage current can flow to the withstanding-voltage reducing circuit 250-1. For example, when the voltage (eg, V_CH1) at the first channel output terminal (CH1) 240-1 exceeds a predetermined voltage in a state in which current does not flow to the switching element 233-1, leakage current I_LEAK_CH1 can flow from the first LED string 220a to the withstanding-voltage reducing circuit 250-1. Accordingly, the voltage (eg, V_CH1) at the first channel output terminal (CH1) 240-1 can be reduced. As the voltage (eg, V_CH1) at the first channel output terminal (CH1) 240-1 decreases, the switching element 233-1 can be configured with a voltage lower than the output voltage VLED of the power control circuit 21 as a withstand voltage.

According to the embodiment, the switching element 233-1 can be turned on according to the control of the PWM signal so that current can flow from the drain terminal of the switching element 233-1 to the source terminal. In this case, the plurality of LEDs included in the first LED string 220a can emit light by the current (eg, I_CH1) flowing through the first LED string 220a. At this time, the voltage (eg, V_CH1) at the point (eg, the first channel output terminal (CH1) 240-1) connected in parallel with the switching element 233-1 can have a relatively low voltage (eg, 0.5V) according to the voltage drop in the first LED string 220a. On the other hand, the switching element 233-1 can be turned off according to the control of the PWM signal so that current cannot flow from the drain terminal of the switching element 233-1 to the source terminal. In this case, current does not flow even through the first LED string 220a so that the plurality of LEDs included in the first LED string 220a cannot emit light.

According to the embodiment, when the current does not flow from the drain terminal of the switching element 233-1 to the source terminal due to the turn-off of the switching element 233-1, as current does not flow in the first LED string 220*a*, no voltage drop occurs in the first LED string 220*a*. Accordingly, the voltage (V_CH1) applied to the first channel output terminal (CH1) 240-1 between the first LED driving circuit 230-1 and the first LED string 220*a* can theoretically be the same voltage as the voltage applied to the first LED string 220*a*, that is, the output voltage VLED of the power control circuit 210 (eg, 120V).

At this time, referring to FIG. 3, as described above, the voltage (eg, V_CH1) at the first channel output terminal (CH1) 240-1) can be the same as the output voltage (VLED) (eg, 120V) of the power control circuit 210 and can exceed a predetermined voltage (eg, 40V). In this case, the leakage current I_LEAK_CH1 flows from the first LED string 220*a* to the withstanding-voltage reducing circuit 250-1 so that the voltage (eg, V_CH1) at the first channel output terminal (CH1) 240-1) can be reduced. As the voltage (eg, V_CH1) at the first channel output terminal (CH1) 240-1 decreases, the switching element 233-1 can be configured with a voltage lower than the output voltage VLED of the power control circuit 21 as a withstand voltage.

In summary, the leakage current I_LEAK_CH1 cannot flow in the withstanding-voltage reducing circuit 250-1 within a time period in which the current flows through the switching element 233-1 based on the input voltage of the gate terminal of the switching element 233-1, that is, the difference between the reference voltage VREF and the source voltage.

The leakage current I_LEAK_CH1 can flow in the withstanding-voltage reducing circuit 250-1 within a time period during which the current flowing through the switching element 233-1 is blocked based on the input voltage of the gate terminal of the switching element 233-1, that is, the difference between the reference voltage VREF and the source voltage.

Figure 4:
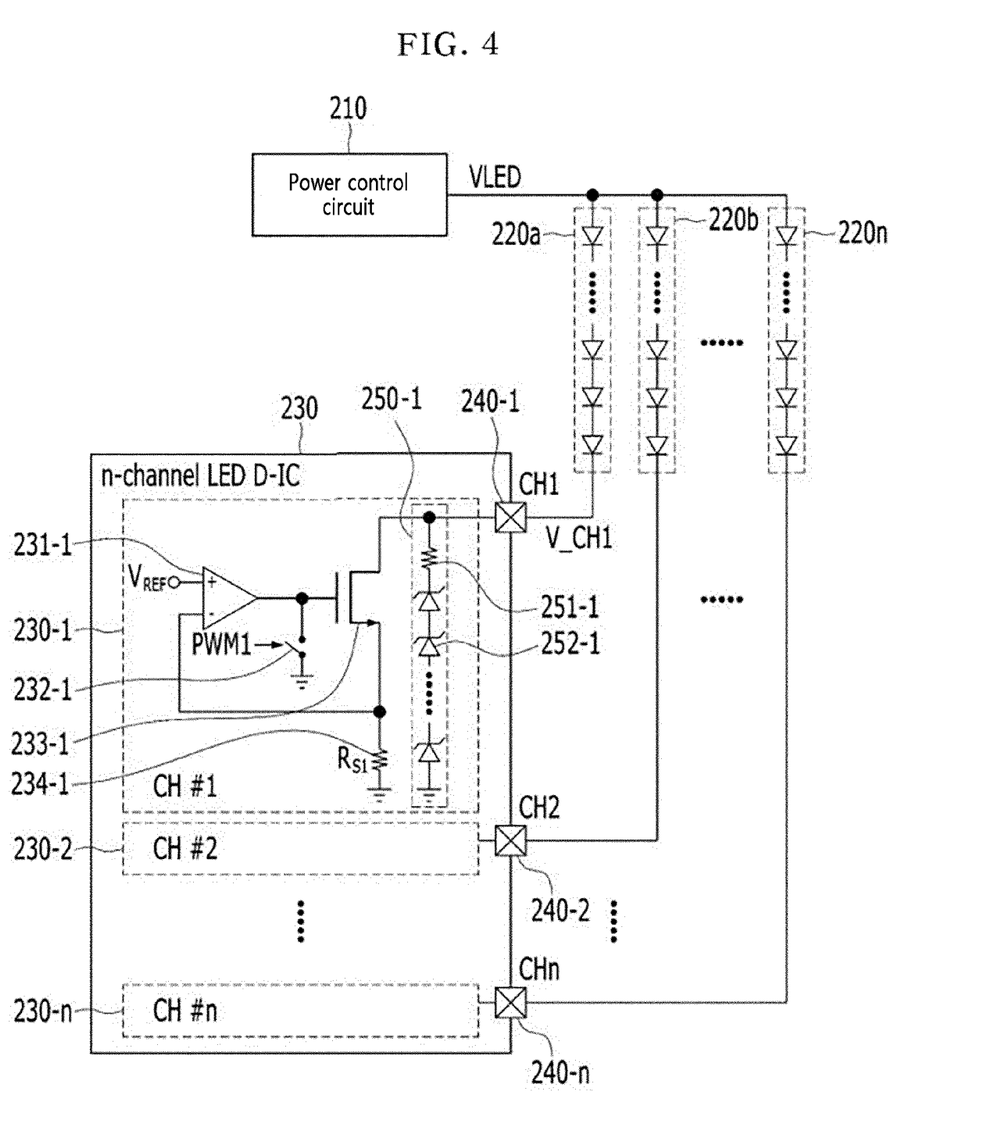
FIG. 4 is a detailed circuit diagram of the display device comprising an LED driving circuit according to the second embodiment.

FIG. 4 is a detailed circuit diagram of the display device comprising an LED driving circuit according to the second embodiment.

Referring to FIG. 4, the withstanding-voltage reducing circuit 250-1 shown in FIG. 3 can comprise at least one or more Zener diode 252-1. According to the embodiment, when the current does not flow from the drain terminal of the switching element 233-1 to the source terminal due to the turning off of the switching element 233-1, the voltage V_CH1 applied to the first channel output terminal (CH1) 240-1 between the first LED driving circuit 230-1 and the first LED string 220*a* cam increase. That is, as the voltage (V_CH1) applied to the first channel output terminal (CH1) 240-1 between the first LED driving circuit 230-1 and the first LED string 220*a* increases, it can be equal to the output voltage VLED of the power control circuit 210.

As such, when the voltage (V_CH1) applied to the first channel output terminal (CH1) 240-1 between the first LED driving circuit 230-1 and the first LED string 220*a* exceeds a predetermined voltage, a leakage current flows into the withstanding-voltage reducing circuit 250-1 so that the magnitude of the voltage applied to the switching element 233-1 can be reduced. That is, the leakage current I_LEAK_CH1 can flow in the withstanding-voltage reducing circuit 250-1 within a time period during which the current flowing through the switching element 233-1 is blocked based on the input voltage of the gate terminal of the switching element 233-1, that is, the difference between the reference voltage VREF and the source voltage.

In this case, the predetermined voltage through which the leakage current flows to the withstanding-voltage reducing circuit 250-1 can be determined based on the number of Zener diodes 252-1 included in the withstanding-voltage reducing circuit 250-1. For example, assuming that the breakdown voltage of one Zener diode 252-1 is 5V and 8 Zener diodes are connected in series in the withstanding-voltage reducing circuit 250-1, the predetermined voltage can be 40V (8×5V). For example, when the voltage (V_CH1) applied to the first channel output terminal (CH1) 240-1 between the first LED driving circuit 230-1 and the first LED string 220*a* increases to 40V or more, leakage current can flow into the withstanding-voltage reducing circuit 250-1. As the leakage current flows into the withstanding-voltage reducing circuit 250-1, the voltage (V_CH1) applied to the first channel output terminal (CH1) 240-1 between the first LED driving circuit 230-1 and the first LED string 220*a* can be adjusted to 40V or less.

According to an embodiment, the withstanding-voltage reducing circuit 250-1 can comprise at least one resistor 251-1. For example, the amount of leakage current flowing through the withstanding-voltage reducing circuit 250-1 can be determined according to a resistance value of the at least one resistor 251-1. When the resistor 251-1 having a relatively large resistance value is provided, the amount of leakage current flowing through the withstanding-voltage reducing circuit 250-1 can be relatively small.

Figure 5:
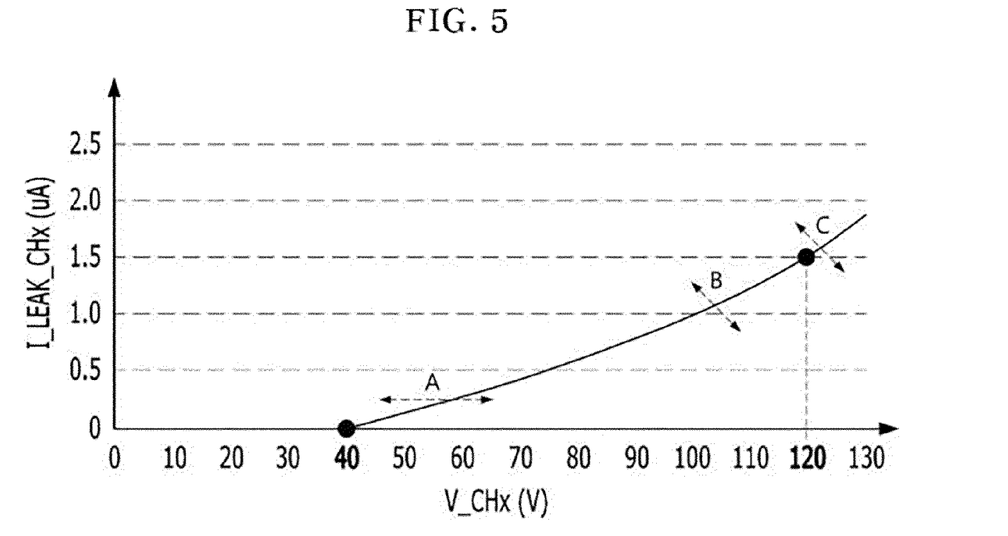
FIG. 5 is a graph showing the relationship between voltage and leakage current at a channel end according to an embodiment.

FIG. 5 is a graph showing the relationship between voltage and leakage current at a channel end according to an embodiment.

Referring to FIG. 5, as described above in the description of FIG. 4, when the voltage (V_CHx) applied to the channel output terminal (CHx) 240-*x* between each LED driving circuit 230 and the connected LED string 220 increases to 40V or more, the leakage current I_LEAK_CHx can flow into the withstanding-voltage reducing circuit 250-1. As shown in FIG. 5, as the voltage V_CHx applied to the channel output terminal (CHx) 240-*x* increases, the amount of leakage current I_LEAK_CHx flowing through the withstanding-voltage reducing circuit 250-1 can increase.

According to the embodiment, the voltage at which the leakage current (I_LEAK_CHx) starts flowing can be adjusted according to the breakdown voltage of the Zener diodes 252-1 included in the withstanding-voltage reducing circuit 250-1 and the number of Zener diodes 252-1, as shown in A of FIG. 5.

According to an embodiment, the amount of leakage current I_LEAK_CHx can be adjusted according to the resistance value of the resistor 251-1 included in the withstanding-voltage reducing circuit 250-1, as shown in B or C of FIG. 5.

Figure 6:
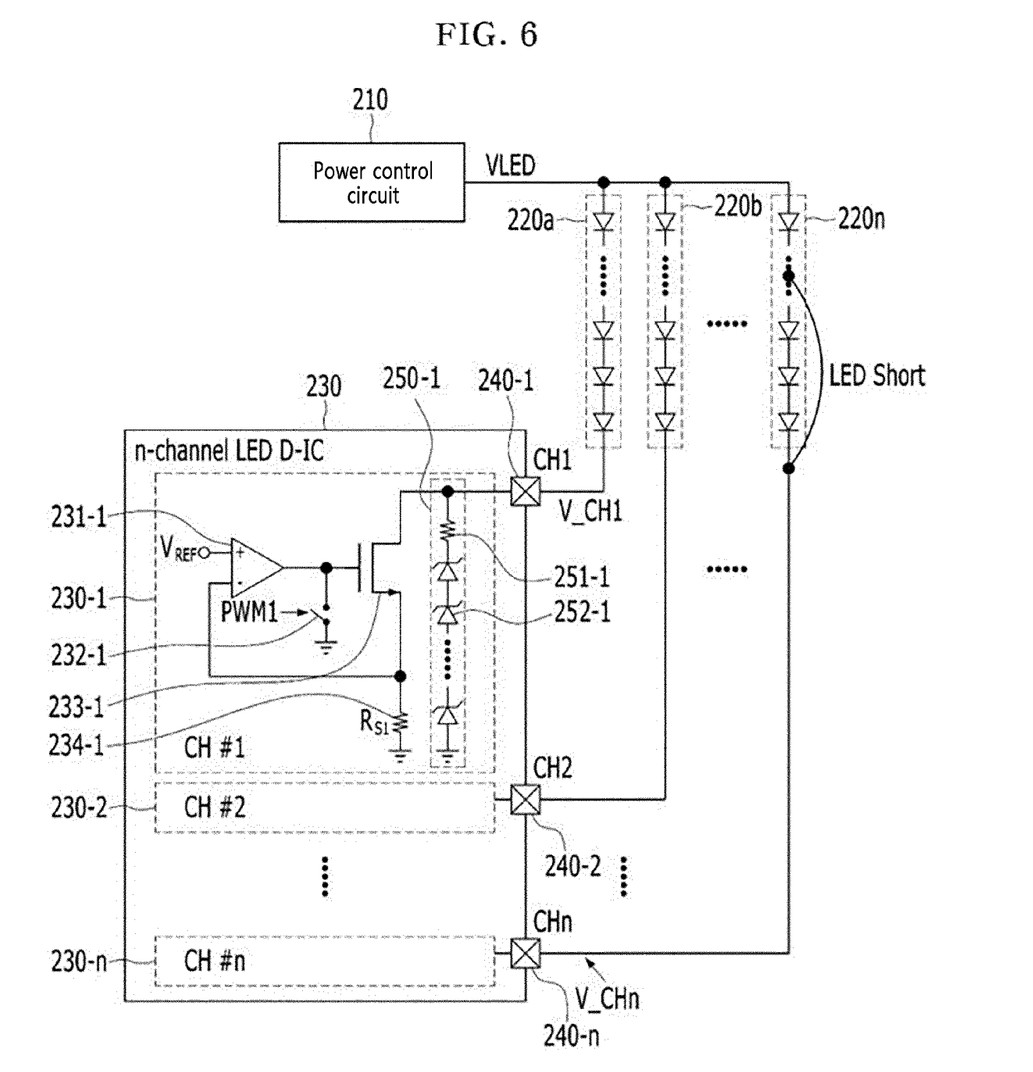
FIG. 6 illustrates a state in which the LED string is short-circuited in the detailed circuit diagram illustrated in FIG. 4.

FIG. 6 illustrates a state in which the LED string is short-circuited in the detailed circuit diagram illustrated in FIG. 4.

Figure 7:
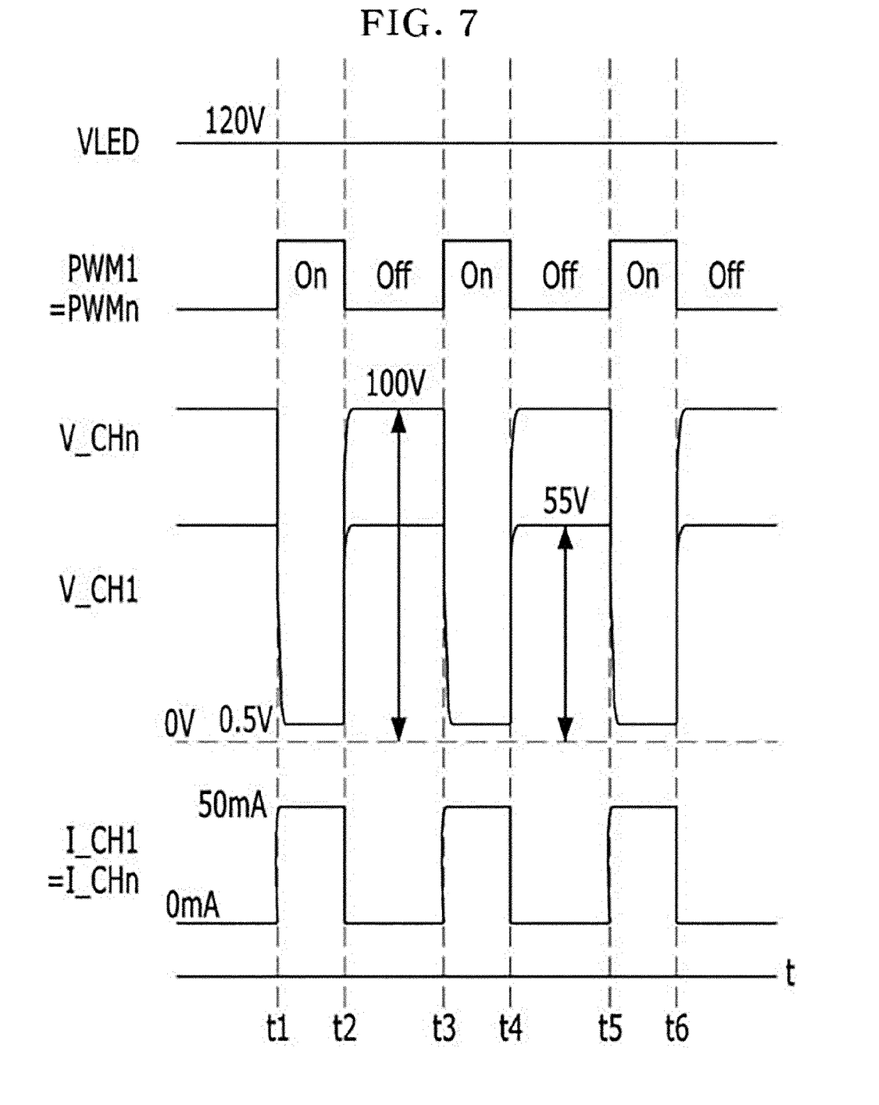
FIG. 7 is a diagram of a graph showing voltage and current at each point of a display device according to an embodiment.
Figure 8:
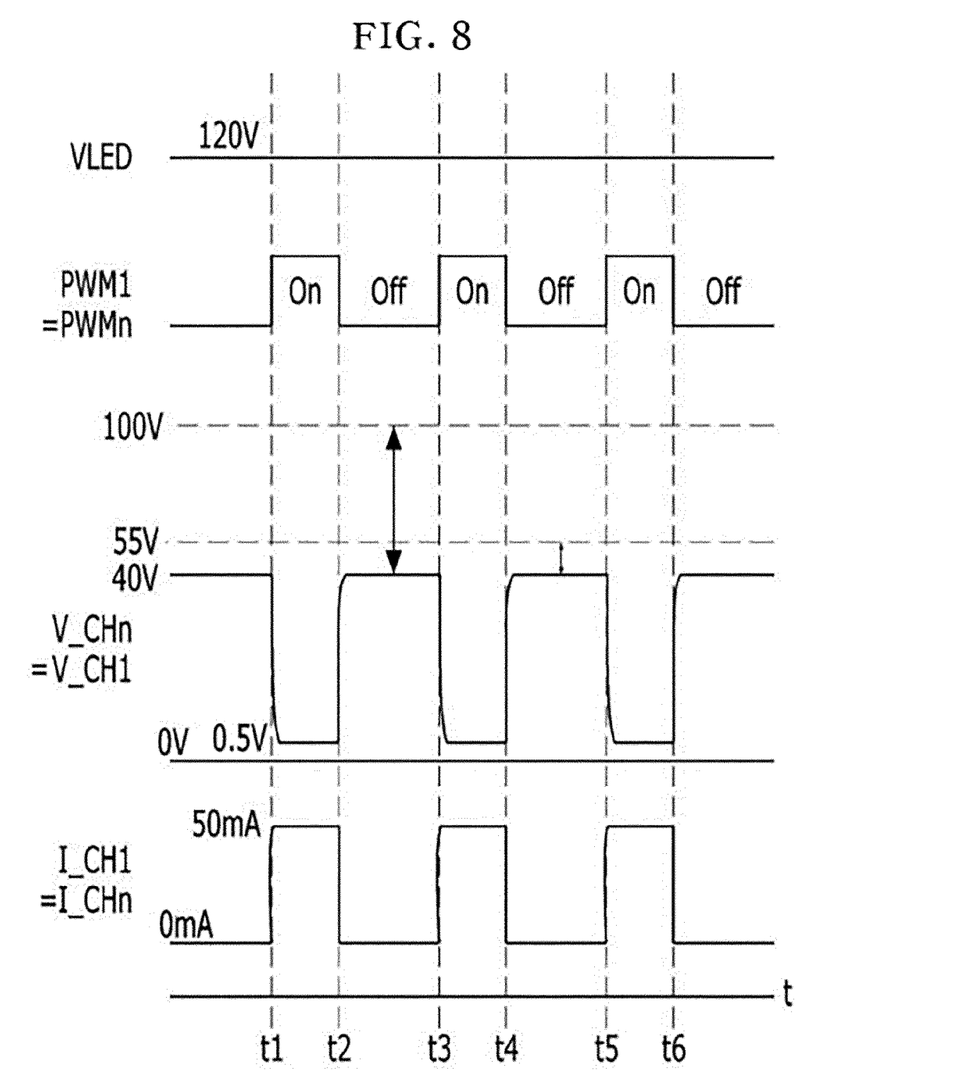
FIG. 8 is another diagram of a graph showing voltage and current at each point of a display device according to an embodiment.

Referring to FIG. 6, any one of the plurality of LED strings 220*a*, 220*b*, . . . , and 220*n* (eg, the n-th LED string 220*n*) can be in a short-circuited state. At this time, the LED included in the short-circuited LED string, that is, the n-th LED string 220*n* cannot emit light normally, and damage can occur to the LED driving IC 230. Referring to FIGS. 7 and 8, damage to the LED driving IC 230 can be protected by adding a withstanding-voltage reducing circuit 250-1 to the LED driving IC 230.

FIGS. 7 and 8 are graphs showing voltage and current at each point of a display device according to an embodiment. FIG. 7 is a graph in the case in which the withstanding-voltage reducing circuits 250-1 are not included in each LED driving circuit (For example, a first LED driving circuit 230-1, a second LED driving circuit 230-2, . . . , and a nth LED driving circuit 230-*n*), and FIG. 8 is a graph of a case in which withstanding-voltage reducing circuits 250-1 are included in each LED driving circuit (For example, a first LED driving circuit 230-1, a second LED driving circuit 230-2, ..., and a nth LED driving circuit 230-n).

Referring to FIG. 7, it is assumed that the output voltage VLED of the power control circuit 210 is 120V and the PWM signal is controlled on/off according to time. When the withstanding-voltage reducing circuit 250-1 is not added to each LED driving circuit (For example, the first LED driving circuit 230-1, the second LED driving circuit 230-2, ..., and the nth LED driving circuit 230-n), the voltage V_CHx and the current I_CHx applied to each channel output terminal (CHx) 240-x can be checked as shown in FIG. 7. For example, the PWM signals PWM1 to PWMn can be controlled to be in an on state in the intervals of t1 to t2, t3 to t4, and t5 to t6, and controlled to be in an off state in the remaining intervals.

According to the embodiment, the current (I_CHx) applied to each channel output stage (CHx) 240-x can be 50 mA in an interval in which the PWM signal is controlled to be in an on state and can be 0 mA in an interval in which the PWM signal is controlled to be in an off state. According to the embodiment, the voltage (V_CH1) applied to the first channel output terminal (CH1) 240-1 between the first LED driving circuit 230-1 and the first LED string 220a can be 0.5V in an interval in which the PWM signal is controlled to be in an on state and can be 100V in an interval in which the PWM signal is controlled to be in an off state. The voltage (V_CHn) applied to the nth channel output terminal (CH1) 240-n between the nth LED driving circuit 230-n and the nth LED string 220n having a short-circuit state can be 0.5V in an interval in which the PWM signal is controlled to be in an on state and can be 100V in an interval in which the PWM signal is controlled to be in an off state.

Therefore, when the withstanding-voltage reducing circuits 250-1 are not included in each LED driving circuit (For example, the first LED driving circuit 230-1, the second LED driving circuit 230-2, ..., and the nth LED driving circuit 230-n), a relatively high voltage (eg, 55V or 100V) can be applied to each channel output terminal (CHx) in an interval in which the PWM signal is controlled to be in an off state, as shown in FIG. 7.

Referring to FIG. 8, it is assumed that the output voltage VLED of the power control circuit 210 is 120V and the PWM signal is controlled on/off according to time. When the withstanding-voltage reducing circuits 250-1 is added to each LED driving circuit (For example, the first LED driving circuit 230-1, the second LED driving circuit 230-2, ..., and the nth LED driving circuit 230-n), the voltage V_CHx and the current I_CHx applied to each channel output terminal (CHx) 240-x can be checked as shown in FIG. 8. For example, the PWM signals PWM1 to PWMn can be controlled to be in an on state in the intervals of t1 to t2, t3 to t4, and t5 to t6, and can be controlled to be in an off state in the remaining intervals.

According to the embodiment, the current (I_CHx) applied to each channel output stage (CHx) 240-x can be 50 mA in an interval in which the PWM signal is controlled to be in an on state and can be 0 mA in an interval in which the PWM signal is controlled to be in an off state. According to the embodiment, the voltage (V_CH1) applied to the first channel output terminal (CH1) 240-1 between the first LED driving circuit 230-1 and the first LED string 220a can be 0.5V in an interval in which the PWM signal is controlled to be in an on state and can be 40V in an interval in which the PWM signal is controlled to be in an off state. The voltage (V_CHn) applied to the nth channel output terminal (CH1) 240-n between the nth LED driving circuit 230-n and the nth LED string 220n having a short-circuit state can be 0.5V in an on state in which the PWM signal is controlled in an on state and can be 40V in an off state in which the PWM signal is in an off state.

Therefore, when the withstanding-voltage reducing circuits 250-1 are included in each LED driving circuit (For example, the first LED driving circuit 230-1, the second LED driving circuit 230-2, ..., and the nth LED driving circuit 230-n), leakage current can flow to the withstanding-voltage reducing circuits 250-1 in an interval in which the PWM signal is controlled to be in an off state, as shown in FIG. 8. Accordingly, it is possible to control a voltage applied to each channel output terminal (CHx) to be equal to or less than a predetermined voltage (eg, 40V).

Figure 9:
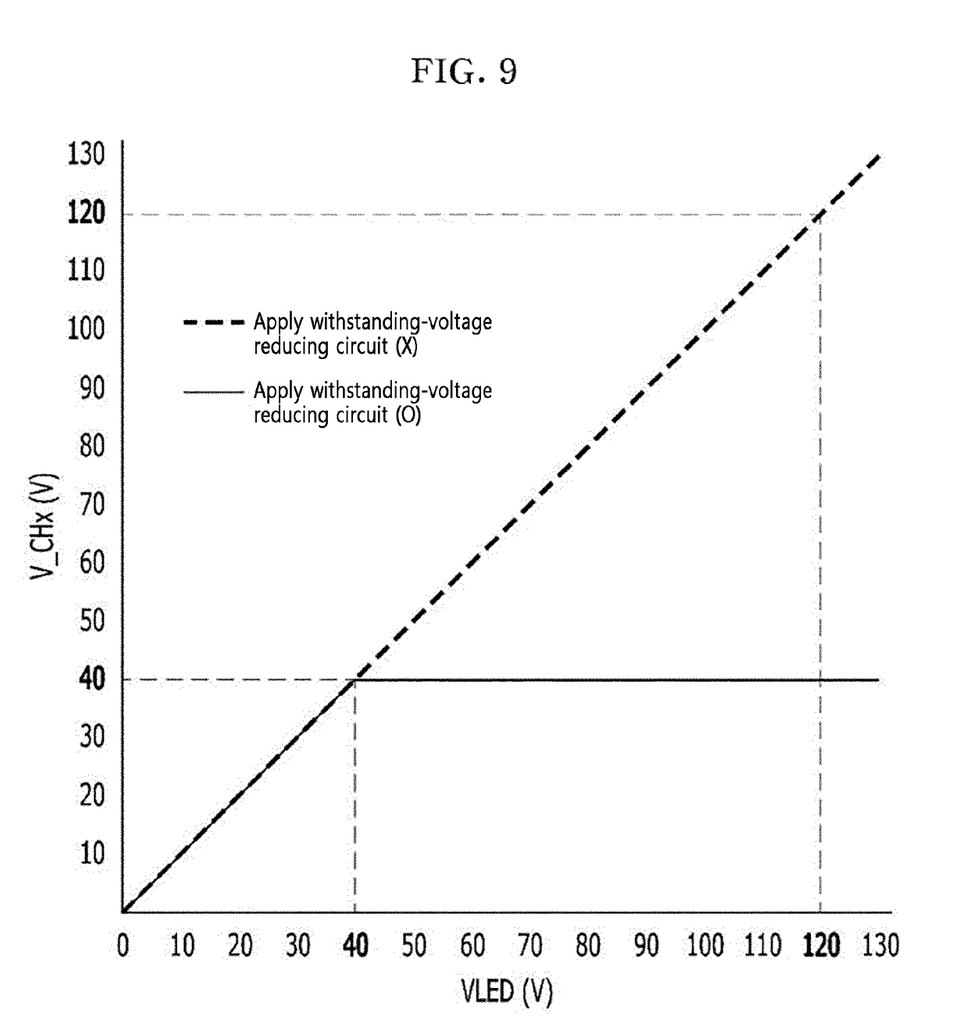
FIG. 9 is a graph showing the relationship between an input voltage of a LED string and a voltage of a channel end according to an embodiment.

FIG. 9 is a graph showing the relationship between an input voltage of a LED string and a voltage of a channel end according to an embodiment.

Referring to FIG. 9, as described above, as the output voltage (VLED) of the power control circuit 210 increases, the voltage (V_CHx) applied to each channel output terminal (CHx) 240-x of the LED driving circuits (For example, the first LED driving circuit 230-1, the second LED driving circuit 230-2, ..., and the nth LED driving circuit 230-n) to which the withstanding-voltage reducing circuit is not applied can be increased (see dotted line). Accordingly, the FET 233 included in each LED driving circuit (For example, the first LED driving circuit 230-1, the second LED driving circuit 230-2, ..., and the nth LED driving circuit 230-n) of the LED driving circuit 230 should be provided as a transistor element capable of withstanding high voltage.

On the other hand, even if the output voltage VLED of the power control circuit 210 increases, the voltage V_CHx applied to each channel output terminal (CHx) 240-x of the LED driving circuits (For example, the first LED driving circuit 230-1, the second LED driving circuit 230-2, ..., and the nth LED driving circuit 230-n) to which the withstanding-voltage reducing circuit is applied can be adjusted to a predetermined voltage (eg, 40V) or less. For example, when the voltage (V_CHx) applied to each channel output terminal (CHx) 240-x is 70V, the leakage current can flow through the withstanding-voltage reducing circuit and can be adjusted to a predetermined voltage (eg, 40V) or less. Accordingly, a switching element (eg, FET 233) included in each LED driving circuit (For example, the first LED driving circuit 230-1, the second LED driving circuit 230-2, ..., and the nth LED driving circuit 230-n) of the LED driving circuit 230 can be provided as a transistor having a relatively low withstand voltage.

According to the embodiment, in the above-described embodiments, FET has been described as an example of a switching element. However, even when a bipolar junction transistor (BJT) is substituted for the FET, the same or similar operation can be performed by adding a withstanding-voltage reducing circuit. As the voltage applied to the switching element (eg, transistor) is reduced using the withstanding-voltage reducing circuit, the size of the LED driving circuit can be drastically reduced.

What is claimed is:
1. A light emitting diode (LED) driving circuit, comprising:
   a switching element having a drain terminal connected to one end of an LED string and configured to adjust current flowing through the LED string;
   an operational amplifier having an output terminal connected to a gate terminal of the switching element;
   a PWM switch connected to the output terminal of the operational amplifier and the gate terminal of the switching element and configured to control an on/off state of the switching element in response to a pulse width modulation signal; and a withstanding-voltage reducing circuit connected in parallel with the switching element and configured to allow a leakage current to flow when a voltage at the drain terminal of the switching element exceeds a predetermined voltage;

wherein when the switching element is turned off under control of the PWM switch such that the voltage at the drain terminal of the switching element is greater than the predetermined voltage, the withstanding-voltage reducing circuit is configured to allow the leakage current to flow, and wherein when the switching element is turned on under the control of the PWM switch such that the voltage at the drain terminal of the switching element is smaller than the predetermined voltage, the withstanding-voltage reducing circuit is configured to allow the leakage current not to flow.

2. The LED driving circuit of claim 1, wherein the switching element comprises a field effect transistor.

3. The LED driving circuit of claim 2, wherein the switching element is configured to adjust the current flowing through the LED string based on the control of the PWM switch.

4. The LED driving circuit of claim 3, wherein the withstanding-voltage reducing circuit is configured to allow the leakage current to flow within a time period in which current flowing through the switching element is blocked based on the control of the PWM switch.

5. The LED driving circuit of claim 3, wherein the withstanding-voltage reducing circuit is configured to not allow the leakage current to flow within a time period in which current flows through the switching element based on the control of the PWM switch.

6. The LED driving circuit of claim 5, wherein the withstanding-voltage reducing circuit comprises:
a plurality of Zener diodes,
wherein the predetermined voltage is determined based on a number of the plurality of Zener diodes, and the number of the plurality of Zener diodes is based on a number of a plurality of LEDs included in the LED string.

7. The LED driving circuit of claim 6, wherein the withstanding-voltage reducing circuit further comprises:
at least one resistor connected to one of the plurality of Zener diodes.

8. The LED driving circuit of claim 7, wherein an amount of the leakage current flowing through the withstanding-voltage reducing circuit is determined according to a resistance value of the at least one resistor.

9. The LED driving circuit of claim 1, wherein the switching element and the withstanding-voltage reducing circuit are configured as one LED driving integrated circuit.

10. The LED driving circuit of claim 1,
wherein the switching element and the withstanding-voltage reducing circuit are connected to a channel output terminal.

11. A display device, comprising:
a plurality of LED strings; and
a plurality of LED driving circuits each connected to one of the plurality of LED strings,
wherein each of the plurality of LED driving circuits comprises:
a switching element having a drain terminal connected to one end of each of the plurality of LED strings and configured to adjust current flowing through each of the plurality of LED strings;
an operational amplifier having an output terminal connected to a gate terminal of the switching element;
a PWM switch connected to the output terminal of the operational amplifier and the gate terminal of the switching element and configured to control an on/off state of the switching element in response to a pulse width modulation signal; and
a withstanding-voltage reducing circuit connected in parallel with the switching element and configured to allow a leakage current to flow when a voltage at the drain terminal of the switching element exceeds a predetermined voltage,
wherein when the switching element is turned off under control of the PWM switch such that the voltage at the drain terminal of the switching element is greater than the predetermined voltage, the withstanding-voltage reducing circuit is configured to allow the leakage current to flow, and
wherein when the switching element is turned on under the control of the PWM switch such that the voltage at the drain terminal of the switching element is smaller than the predetermined voltage, the withstanding-voltage reducing circuit is configured to allow the leakage current not to flow.

12. The display device of claim 11, wherein the switching element comprises a field effect transistor.

13. The display device of claim 12, wherein the switching element is configured to adjust the current flowing through the each of the plurality of LED strings based the control of the PWM switch.

14. The display device of claim 13, wherein the withstanding-voltage reducing circuit is configured to allow the leakage current to flow within a time period in which the current flowing through the switching element is blocked based on the control of the PWM switch.

15. The display device of claim 13, wherein the withstanding-voltage reducing circuit is configured to not allow the leakage current to flow within a time period in which current flows through the switching element based on the control of the PWM switch.

16. The display device of claim 15, wherein the withstanding-voltage reducing circuit comprises:
a plurality of Zener diodes,
wherein the predetermined voltage is determined based on a number of the plurality of Zener diodes, and the number of the plurality of Zener diodes is based on a number of a plurality of LEDs included in the each of the plurality of LED strings.

17. The display device of claim 16, wherein the withstanding-voltage reducing circuit further comprises:
at least one resistor connected to one of the plurality of Zener diodes.

18. The display device of claim 17, wherein an amount of the leakage current flowing through the withstanding-voltage reducing circuit is determined according to a resistance value of the at least one resistor.

* * * * *